(12) United States Patent
Chang et al.

(10) Patent No.: US 12,452,117 B2
(45) Date of Patent: *Oct. 21, 2025

(54) METHOD AND APPARATUS FOR GENERATING/TRANSMITTING A FRAME FOR WIRELESS COMMUNICATION, AND SYNCHRONIZATION ESTIMATION METHOD FOR WIRELESS COMMUNICATION

(71) Applicant: ELECTRONICS AND TELECOMMUNICATIONS RESEARCH INSTITUTE, Daejeon (KR)

(72) Inventors: Kapseok Chang, Daejeon (KR); Wooyong Lee, Daejeon (KR); Hyun-Kyu Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 74 days.

This patent is subject to a terminal disclaimer.

(21) Appl. No.: 18/505,888

(22) Filed: Nov. 9, 2023

(65) Prior Publication Data

US 2024/0080232 A1 Mar. 7, 2024

Related U.S. Application Data

(63) Continuation of application No. 17/221,464, filed on Apr. 2, 2021, now Pat. No. 11,848,807, which is a (Continued)

(30) Foreign Application Priority Data

Aug. 25, 2009 (KR) .................. 10-2009-0078935
Aug. 23, 2010 (KR) .................. 10-2010-0081409

(51) Int. Cl.
*H04L 27/26* (2006.01)
*H04W 56/00* (2009.01)
(Continued)

(52) U.S. Cl.
CPC ........ *H04L 27/261* (2013.01); *H04L 27/2613* (2013.01); *H04L 27/2692* (2013.01);
(Continued)

(58) Field of Classification Search
CPC .............. H04L 27/261; H04L 27/2613; H04L 27/2692; H04W 56/0085; H04W 72/04; H04W 84/12
See application file for complete search history.

(56) References Cited

U.S. PATENT DOCUMENTS 4,912,412 A 3/1990 Suzuki et al.
5,345,440 A 9/1994 Gledhill et al.
(Continued)

FOREIGN PATENT DOCUMENTS

EP 1959625 A1 8/2008
EP 2051424 A1 4/2009
(Continued)

OTHER PUBLICATIONS

Motorola: "Text Proposal for 3GPP2 Phase II Air Interface Evolution", 3GPP2 Draft; C30-20060626-019-MOT_Phase2_Text Proposal, 3rd Generation Partnership Project 2, 3GPP2, 2500 Wilson Boulevard, Suite 300, Arlington, Virginia 22201 ; USA vol. TSGC Jun. 27, 2006 (Jun. 27, 2006).
(Continued)

*Primary Examiner* — Syed Haider
(74) *Attorney, Agent, or Firm* — BROADVIEW IP LAW, PC

(57) ABSTRACT

Disclosed is a technique related to a method and apparatus for generating a preamble and a data frame for wireless
(Continued)

communication, and to a synchronization estimation method using the preamble. According to the technique, a method for generating a frame for wireless communication is disclosed, wherein the method comprises: a step of generating a modified sequence using a first base sequence for synchronization estimation; and a step of allocating the first base sequence and the modified sequence to the frequency domain of a first timeslot to generate a preamble. The modified sequence includes a complex conjugated sequence of the first base sequence or a sequence having a code different from that of the first base sequence.

2 Claims, 8 Drawing Sheets

Related U.S. Application Data continuation of application No. 16/685,507, filed on Nov. 15, 2019, now Pat. No. 10,972,325, which is a continuation of application No. 15/871,760, filed on Jan. 15, 2018, now Pat. No. 10,484,221, which is a continuation of application No. 13/392,468, filed as application No. PCT/KR2010/005591 on Aug. 23, 2010, now Pat. No. 10,277,443.

(51) Int. Cl.
  *H04W 72/04* (2023.01)
  *H04W 84/12* (2009.01)
(52) U.S. Cl.
  CPC ........ *H04W 56/0085* (2013.01); *H04W 72/04* (2013.01); *H04W 84/12* (2013.01)

(56) References Cited

U.S. PATENT DOCUMENTS

| | | | |
|---|---|---|---|
| 5,450,456 A * | 9/1995 | Mueller | H04L 27/2613 370/479 |
| 6,359,874 B1 | 3/2002 | Dent | |
| 2003/0031121 A1 | 2/2003 | Sudo | |
| 2003/0072452 A1 | 4/2003 | Mody et al. | |
| 2005/0201476 A1 | 9/2005 | Kim et al. | |
| 2006/0018251 A1 | 1/2006 | Park et al. | |
| 2006/0050799 A1 | 3/2006 | Hou et al. | |
| 2006/0067256 A1 * | 3/2006 | Alazraki | H04L 1/0003 370/300 |
| 2006/0203932 A1 * | 9/2006 | Palanki | H04L 25/023 375/295 |
| 2006/0256839 A1 * | 11/2006 | Tsai | H04L 5/0016 375/131 |
| 2007/0019579 A1 | 1/2007 | Xu et al. | |
| 2008/0095287 A1 | 4/2008 | Matsuo et al. | |
| 2008/0170602 A1 | 7/2008 | Guey | |
| 2009/0016464 A1 | 1/2009 | Zheng et al. | |
| 2009/0046629 A1 | 2/2009 | Jiang et al. | |
| 2009/0060003 A1 | 3/2009 | Hayashi et al. | |
| 2009/0080569 A1 | 3/2009 | Han et al. | |
| 2010/0034155 A1 | 2/2010 | Noh et al. | |
| 2010/0054116 A1 | 3/2010 | Ishii et al. | |
| 2010/0074343 A1 | 3/2010 | Gaal et al. | |
| 2010/0111225 A1 | 5/2010 | Kroeger | |
| 2011/0051822 A1 | 3/2011 | Chang et al. | |
| 2012/0057651 A1 | 3/2012 | Kim | |
| 2018/0367271 A1 | 12/2018 | Park et al. | |
| 2020/0383074 A1 | 12/2020 | Chang et al. | |

FOREIGN PATENT DOCUMENTS

| | | |
|---|---|---|
| EP | 2293506 A2 | 3/2011 |
| KR | 1020060096475 A | 9/2006 |
| KR | 1020070020538 A | 2/2007 |
| KR | 1020070073670 A | 7/2007 |
| KR | 1020080057138 A | 6/2008 |
| KR | 1020090117595 A | 11/2009 |
| KR | 100964108 B1 | 6/2010 |
| WO | 2008038248 A2 | 4/2008 |
| WO | 2009136753 A2 | 11/2009 |

OTHER PUBLICATIONS

Choi et al. (Jul. 6, 2009) FPP-SUN Detailed Proposal.
European Office Action mailed on Feb. 5, 2020 for the corresponding EP Patent Application No. 10812212.8.
Kiran Kuchi et al. (Jul. 7, 2008) Interference Mitigation using Conjugate Data Repetition.
Pan Yuh Joo et al. (Jul. 6, 2001) Simple Preamble Design for OFDM/OFDMA.
T. Schmidl et al. (Sep. 2009) Suggested Improvements to SUN FPP Proposal.
3rd Generation Partnership Project; Technical Specification Group Radio Access Network; Evolved Universal Terrestrial Radio Access; Physical Channels and Modulation; Release 8 (3GPP TS36.211 v8.7.0), Jun. 8, 2009.

* cited by examiner

METHOD AND APPARATUS FOR GENERATING/TRANSMITTING A FRAME FOR WIRELESS COMMUNICATION, AND SYNCHRONIZATION ESTIMATION METHOD FOR WIRELESS COMMUNICATION

CROSS-REFERENCE TO RELATED APPLICATION

This application is a continuation of U.S. application Ser. No. 17/221,464, filed on Apr. 2, 2021, which is a continuation of U.S. application Ser. No. 16/685,507, filed on Nov. 15, 2019, granted U.S. Pat. No. 10,972,325, issued on Apr. 6, 2021, which is a continuation of U.S. application Ser. No. 15/871,760, filed on Jan. 15, 2018, granted U.S. Pat. No. 10,484,221, issued on Nov. 19, 2019, which is a continuation of U.S. application Ser. No. 13/392,468, filed on May 9, 2012, granted U.S. Pat. No. 10,277,443, issued on Apr. 30, 2019, which is a national stage entry of PCT International Application No. PCT/KR2010/005591, filed on Aug. 23, 2010, which claims priority to Korean Patent Application No. 10-2009-0078935, filed on Aug. 25, 2009, and Korean Patent Application No. 10-2010-0081409, filed on Aug. 23, 2010, the entire contents of which are hereby incorporated by references in its entirety.

TECHNICAL FIELD

The present invention relates to a method and apparatus for generating and transmitting a frame for wireless communication and a synchronization estimation method for wireless communication, and more particularly, to a method and apparatus for generating and transmitting a preamble and a data frame for wireless communication and a synchronization estimation method using a preamble.

BACKGROUND ART

A preamble may be used for time and frequency synchronization between a transmission side and a reception side that perform wireless communication. The preamble may also be used for automatic gain control (AGC) and signal detection.

In particular, in a conventional Institute of Electrical and Electronics Engineers (IEEE) environment, a preamble may include two orthogonal frequency division multiplexing (OFDM) symbols, each including a single cyclic prefix (CP) and four repetition pattern (RP) sequences. That is, an RP sequence may be generated by assigning a complex sequence element to a frequency domain with respect to four time intervals within a preamble interval. A CP may be generated using an RP sequence whereby a single OFDM symbol may be generated. Another OFDM symbol may be generated whereby the preamble may include two OFDM symbols.

DISCLOSURE OF INVENTION

Technical Goals

An aspect of the present invention provides a method and apparatus for generating a frame for wireless communication that may generate a preamble capable of enhancing automatic gain control, signal detection, and time and frequency synchronization performances.

Another aspect of the present invention also provides a synchronization estimation method for wireless communication using a preamble of a structure capable of enhancing automatic gain control, signal detection, and time and frequency synchronization performances.

Another aspect of the present invention also provides a method and apparatus for generating a frame for wireless communication that may generate a data frame capable of enhancing the data communication efficiency.

Other features and advantages of the invention may be understood from the following description and be more apparent from embodiments of the invention. Also, features and advantages of the invention may be easily performed by means disclosed in the claims and combinations thereof.

Technical Solutions

According to an aspect of the present invention, there is provided a method of generating a frame for wireless communication, the method including: generating a modified sequence using a first base sequence for synchronization estimation; and generating a preamble by assigning the first base sequence and the modified sequence to a frequency domain of a first time interval. The modified sequence may include a complex conjugate sequence of the first base sequence or a sequence having a sign different from a sign of the first base sequence.

According to another aspect of the present invention, there is provided an apparatus for generating a frame for wireless communication, the apparatus including: a sequence generator to generate a modified sequence using a base sequence for synchronization estimation; and a preamble generator to generate a preamble by assigning the base sequence and the modified sequence to a frequency domain of the same time interval. The modified sequence may include a complex conjugate sequence of the base sequence or a sequence having a sign different from a sign of the base sequence.

According to still another aspect of the present invention, there is provided a synchronization estimation method for wireless communication, the method including: receiving a preamble from a station; and estimating synchronization with the station using the preamble. The preamble may be a preamble in which a base sequence for synchronization estimation and a modified sequence of the base sequence are assigned to a frequency domain of the same time interval, and the modified sequence may include a complex conjugate sequence of the base sequence or a sequence having a sign different from a sign of the base sequence.

According to yet another aspect of the present invention, there is provided a method of generating a frame for wireless communication, the method including: generating modified data having a complex conjugate form of bit data, using the bit data; generating a data frame by assigning the bit data and the modified data to a frequency domain of the same time interval; and transmitting the data frame to a station.

According to a further another aspect of the present invention, there is provided a method of transmitting a frame for wireless communication, the method including: generating modified data having a complex conjugate form of bit data, using the bit data mapping complex coordinates; generating a data frame by assigning the bit data to a half of the entire orthogonal frequency division multiplexing (OFDM) subcarriers according to predetermined frequency resources and by assigning the modified data to the remaining half of the OFDM subcarriers in the same time interval; and transmitting the data frame to a station.

According to still another aspect of the present invention, there is provided a method of receiving a data frame for wireless communication, the method including: receiving a data frame from a station; and decoding the data frame. The data frame may be a data frame in which bit data mapping complex coordinates and modified data having a complex conjugate type of the bit data may be assigned to a frequency domain of the same time interval.

Effect of the Invention

According to embodiments of the present invention, it is possible to generate a preamble capable of enhancing automatic gain control, signal detection, and time and frequency synchronization performances. Using the preamble, the complexity of a reception apparatus may decrease, and automatic gain control, signal detection, and time and frequency synchronization performances required for wireless communication may be enhanced.

Also, according to embodiments of the present invention, there may be provided a data frame capable of enhancing the data communication efficiency.

BEST MODE FOR CARRYING OUT THE INVENTION

For detailed description so that those skilled in the art may easily implement the technical spirit of the invention, exemplary embodiments of the invention will be described with reference to the accompanying drawings. The above objectives, features, and advantages will be more apparent from the following description associated with the accompanying drawings. When it is determined that detailed description related to the known art may make the purpose of the invention unnecessarily ambiguous in describing the invention, the detailed description will be omitted here.

Figure 1:
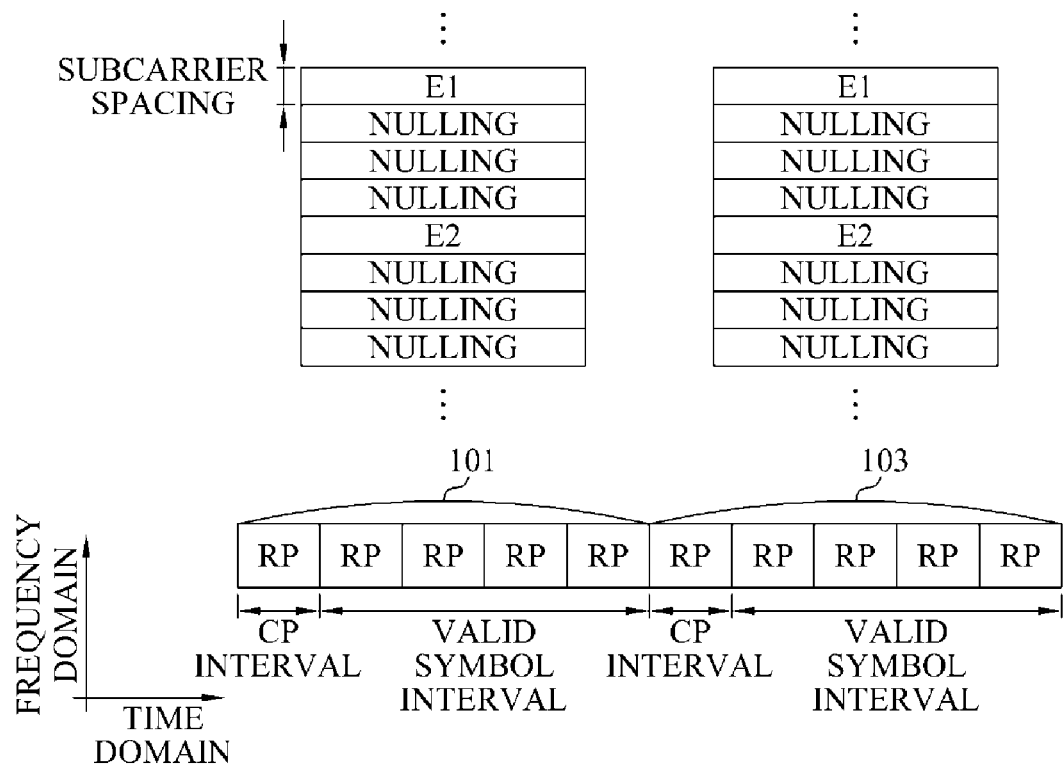
FIG. 1 illustrates a diagram to describe a preamble structure in an Institute of Electrical and Electronics Engineers (IEEE) 802.11 wireless communication system.

FIG. 1 illustrates a diagram to describe a preamble structure in an Institute of Electrical and Electronics Engineers (IEEE) 802.11 wireless communication system.

As shown in FIG. 1, a preamble for synchronization estimation of IEEE 802.11 may include two orthogonal frequency division multiplexing (OFDM) symbols 101 and 103. Each of the two OFDM symbols 101 and 103 may include a total of five repetition pattern (RP) sequences, that is, four RP sequences in a valid symbol interval and a single RP sequence in a cyclic prefix (CP) interval. Four RP sequences in the valid symbol interval may include an element of a base sequence for automatic gain control, signal detection, and synchronization estimation every four subcarriers. As shown in FIG. 1, the element, for example, E1 and E2, of the base sequence may be assigned to a subcarrier based on a predetermined RP. Here, inverse fast Fourier transform (IFFT) may be performed with respect to the element of the base sequence. Here, the valid symbol interval and the CP interval may indicate a time interval of a time domain. The element of the base sequence may be assigned to the frequency domain with respect to the valid symbol interval and the CP interval.

The single RP sequence in the CP interval may be generated by duplicating a last RP sequence of the valid symbol interval. A reception end may perform automatic gain control, signal detection, and time and frequency synchronization using the preamble of FIG. 1.

When using the preamble of FIG. 1, a reception side may need to use both an auto-correlation method and a cross-correlation method together in order to estimate synchronization. Accordingly, complexity may increase in a terminal of the reception side. Also, in the case of the preamble of FIG. 1, since a sequence having good correlation such as Zadofu-Chu complex sequence is not used, a peak-to-average-power ratio (PAPR) may increase and there are some constraints on enhancing synchronization estimation performance. In the case of the preamble of FIG. 1, since a time domain sequence element having a predetermined size for each sample of an OFDM symbol is not used and an RP sequence by a base sequence assigned to a frequency domain, indicating an inconsistent pattern in a time domain, is used, it may be difficult to further enhance automatic gain control and signal detection performances.

In the following, a preamble generation method capable of solving the aforementioned issues according to the present invention will be described. An example of using wireless communication of an OFDM scheme will be described as an embodiment. Meanwhile, the term "station" used in the following may be a concept that includes all of a source node, a relay node, and a destination node for cooperative communication and thus, may be a terminal or an access point (AP).

Figure 2:
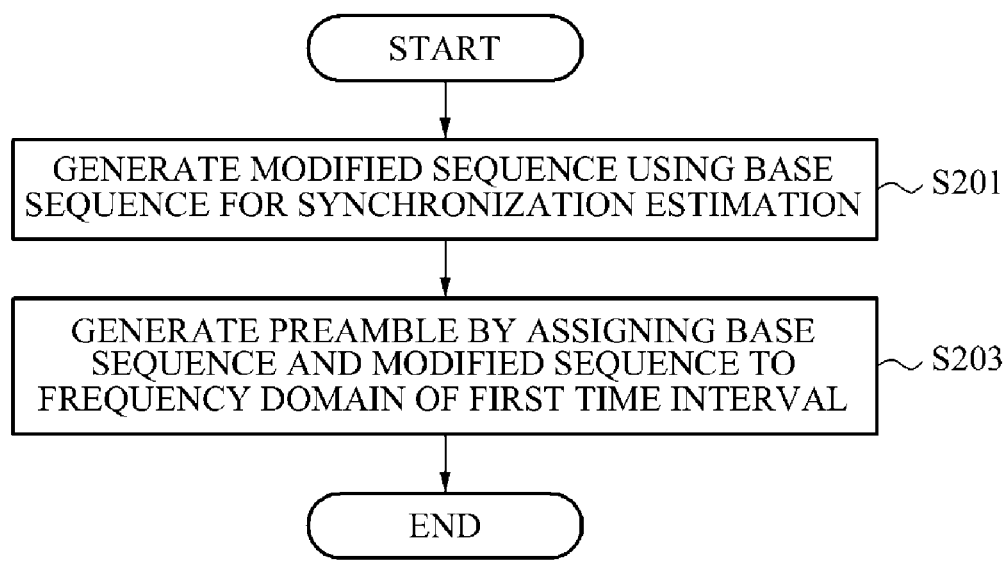
FIG. 2 and FIG. 3 illustrate diagrams to describe a method and apparatus for generating a frame for wireless communication according to an embodiment of the present invention.
Figure 3:
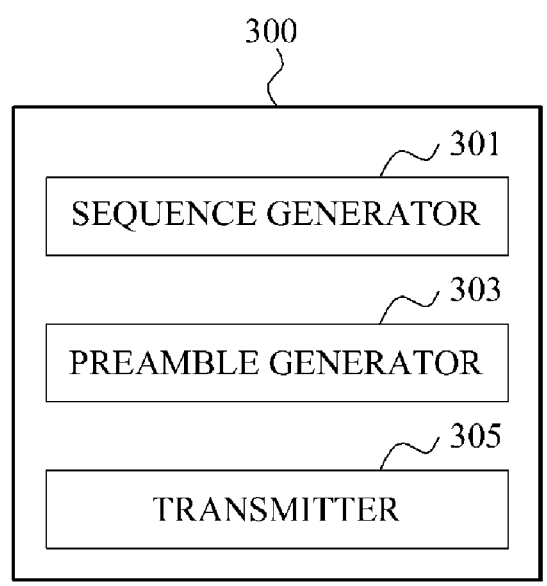

FIG. 2 and FIG. 3 illustrate diagrams to describe a method and apparatus for generating a frame for wireless communication according to an embodiment of the present invention.

As shown in FIG. 2, a method of generating a frame for wireless communication according to the present invention may be performed through operations S201 and S203. As shown in FIG. 3, a frame generation apparatus 300 for wireless communication according to the present invention may include a sequence generator 301 and a preamble generator 303.

Hereinafter, the frame generation method of the frame generation apparatus 300 will be described as an embodiment.

In operation S201, the frame generation apparatus 300 may generate a modified sequence using a first base sequence for synchronization estimation. The modified sequence may include a complex conjugate sequence of the first base sequence or a sequence having a sign different from a sign of the first base sequence. That is, the frame generation apparatus 300 may generate the complex conjugate sequence of the first base sequence or the sequence having the sign different from the sign of the first base sequence.

In operation S203, the frame generation apparatus 300 may generate a preamble by assigning the first base sequence and the modified sequence to a frequency domain of a first time interval. That is, instead of repeatedly assigning a single base sequence element to a frequency domain as described above with reference to FIG. 1, the frame generation method according to the present invention may generate a preamble by assigning the first base sequence and the modified sequence to a frequency domain. By assigning the first base sequence and the modified sequence to a frequency domain of the same time interval, a more robust performance for a frequency offset may be obtained. A method of assigning the first base sequence and the modified sequence to the frequency domain will be further described with reference to FIG. 2.

Operations S201 and S203 may be performed by the sequence generator 301 and the preamble generator 303 of FIG. 3. That is, the sequence generator 301 may generate the modified sequence using the first base sequence for synchronization estimation. The preamble generator 303 may generate the preamble by assigning the first base sequence and the modified sequence to the frequency domain of the first time interval. The preamble generated by the preamble generator 303 may be transmitted to a receiving side station through a transmitter 305.

Figure 4:
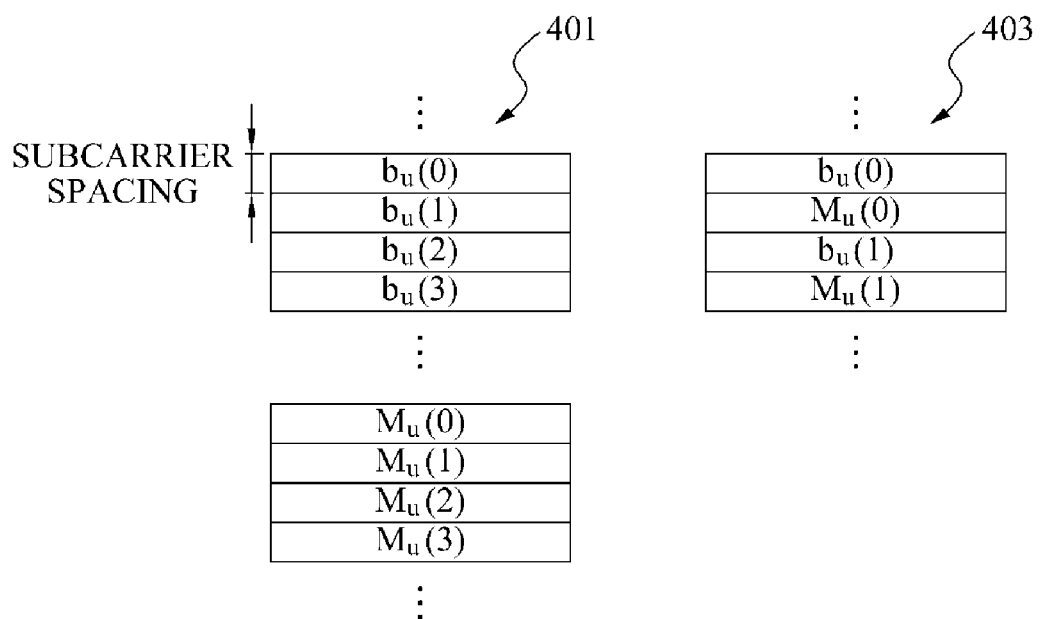
FIG. 4 illustrates a diagram to further describe a frequency domain assignment method described in FIG. 2 and FIG. 3.

FIG. 4 illustrates a diagram to further describe a frequency domain assignment method described in FIG. 2 and FIG. 3.

In FIG. 4, $b_u(m)$ denotes a first base sequence. $M_u(m)$ denotes a modified sequence and may be $-b_u(m)$ or $b^*_u(m)$. Here, '*' indicates changing a sign of an imaginary portion value of a complex conjugate, that is, complex sequence element. 'm' indicates a sequence element as a natural number and 'u' denotes a sequence index. For example, $b_u(0)$ may indicate a first element of the first base sequence.

As shown in FIG. 4, an element of the first base sequence and an element of the modified sequence may be alternately or sequentially assigned to subcarriers. More specifically, a block 401 indicates that the element of the first base sequence and the element of the modified sequence are sequentially assigned to subcarriers. That is, in the block 401, the first base sequence and the modified sequence may be locally assigned. A block 403 indicates that the element of the first base sequence and the element of the modified sequence are alternately assigned to subcarriers. That is, in the block 403, the first base sequence and the modified sequence may be distributed and thereby be assigned.

An example in which all the frequency resources, that is, all the subcarriers available in a frequency domain are used for assignment of a first base sequence and a modified sequence is described as an embodiment. However, as described above with reference to FIG. 1, the first base sequence and the modified sequence may be repeatedly assigned to subcarriers every 'n' times and be nulled with respect to remaining subcarriers. Here, 'n' indicates a natural number. That is, the element of the first base sequence and the element of the modified sequence may be assigned to subcarriers based on a predetermined RP.

The first base sequence may be a predetermined binary sequence or a complex sequence. When the first base sequence is the complex sequence, the modified sequence may be a complex conjugate sequence of the first base sequence or a sequence having a sign difference from a sign of the first base sequence. When the first base sequence is the binary sequence, the modified sequence may be a sequence having a sing different from a sign of the first base sequence. Also, the modified sequence may be a sequence that is modified into another form, instead of being the aforementioned sign converted or complex conjugate sequence. Also, the modified sequence may be a sequence identical to the first base sequence. Even in this case, similar to the above-described method, the first base sequence and the modified sequence may be assigned to subcarriers.

A preamble structure according to embodiments of the present invention will be described with reference to FIG. 5 through FIG. 7. An NRP/NP sequence of FIG. 5 through FIG. 7 may correspond to a sequence described above with reference to FIG. 4.

Figure 5:
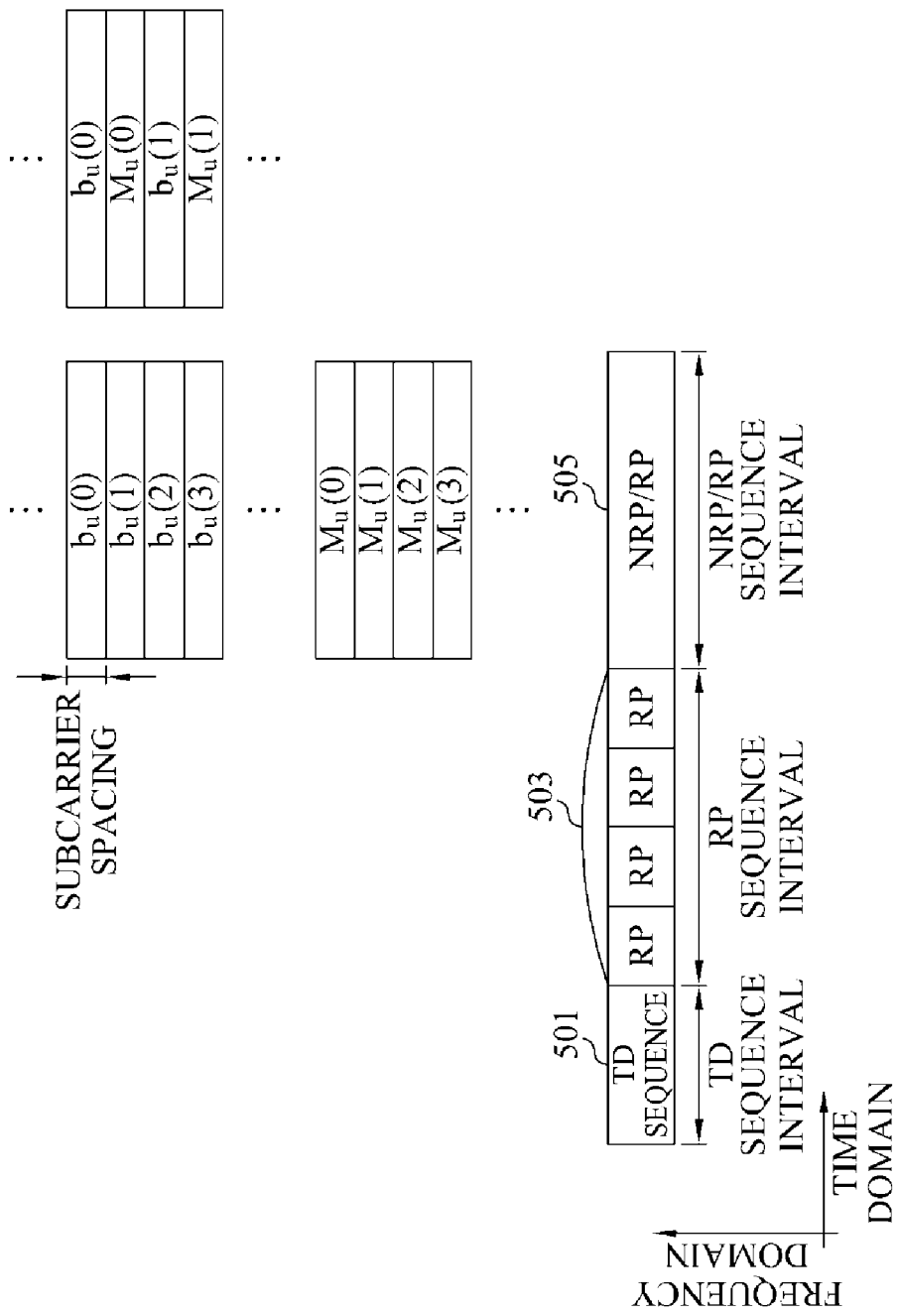
FIG. 5 illustrates a diagram to describe a preamble structure according to an embodiment of the present invention.

FIG. 5 illustrates a diagram to describe a preamble structure according to an embodiment of the present invention.

As shown in FIG. 5, a preamble according to the present invention may include a time division (TD) sequence 501, RP sequences 503, and an NRP/RP sequence 505. The RP sequence 503 may correspond to an RP sequence described above with reference to FIG. 1, and the NRP/RP sequence 505 may include a first base sequence and a modified sequence described above with reference to FIG. 2 through FIG. 4.

The TD sequence 501 may be a binary sequence (or a complex sequence having good correlation) such as a pseudo-noise (PN)-spread binary phase shift keying (BPSK) sequence (or a differentially encoded barker-spread BPSK sequence or all other binary sequences having good correlation), and may be assigned to a TD sequence interval ahead of an RP sequence interval in which the RP sequences 503 are assigned. The TD sequence 501 may be a sequence for automatic gain control or signal detection and be assigned ahead of a time interval in which the NRP/RP sequence 505 is assigned. That is, the frame generation apparatus 300 according to the present invention may generate a preamble by additionally assigning a second base sequence, for example, the TD sequence 501, for automatic gain control or signal detection to a second time interval ahead of the first time interval. As described above with reference to FIG. 2, the first time interval may be a time interval in which the NRP/RP sequence 505 is assigned.

In the second time interval, an element of the TD sequence 501 may have a constant amplitude. That is, the element of the TD sequence 501 may have a predetermined size for each sample of an OFDM symbol. Using a sequence having a predetermined size for each sample of an OFDM symbol, automatic gain control and signal detection performances may be further enhanced. Time and frequency synchronization may be estimated through the TD sequence 501.

The NRP/RP sequence 505 may be a sequence in which the first base sequence and the modified sequence according to the present invention are assigned. As described above, the NRP/RP sequence 505 may be robust in a frequency offset environment, and be used for precise frequency and time synchronization estimation. Also, the NRP/RP sequence 505 may be used for rough time and frequency synchronization estimation together with the RP sequences 503.

Figure 6:
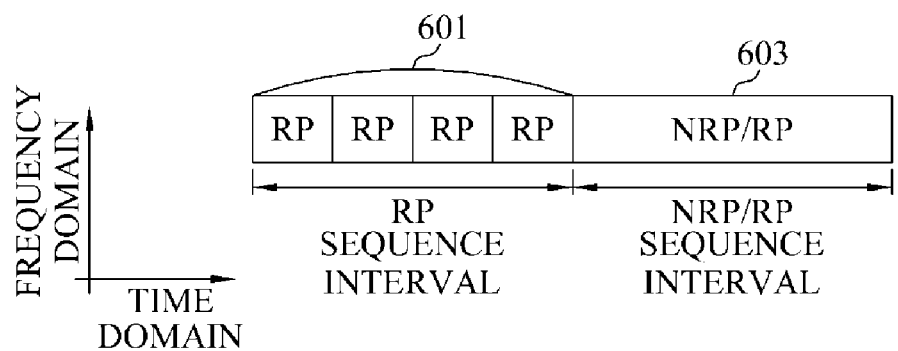
FIG. 6 illustrates a diagram to describe a preamble structure according to another embodiment of the present invention.

FIG. 6 illustrates a diagram to describe a preamble structure according to another embodiment of the present invention.

As shown in FIG. 6, a preamble according to the present invention may include RP sequences 601 and an NRP/RP sequence 603. The preamble of FIG. 6 may not include a TD sequence, which is different from the preamble of FIG. 5.

Figure 7:
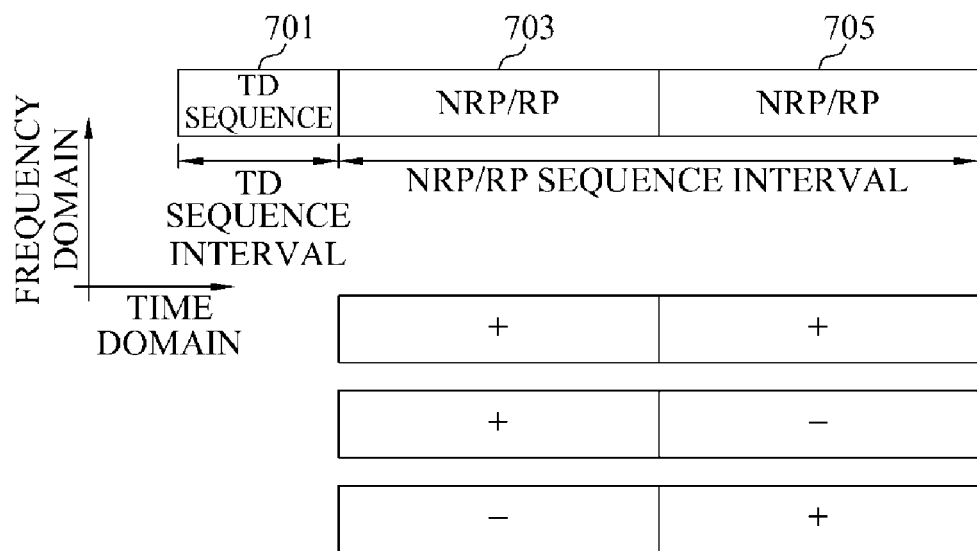
FIG. 7 illustrates a diagram to describe a preamble structure according to still another embodiment of the present invention.

FIG. 7 illustrates a diagram to describe a preamble structure according to still another embodiment of the present invention. An example in which a preamble includes two NRP/RP sequences 703 and 705 will be described with reference to FIG. 7.

As shown in FIG. 7, a preamble according to the present invention may include a TD sequence 701 and two NRP/RP sequences 703 and 705. The preamble of FIG. 7 may not include an RP sequence and may include two NRP/RP sequences, which is different from the preamble of FIG. 5. That is, the frame generation apparatus 300 according to the present invention may generate a preamble by additionally assigning a first base sequence and a modified sequence to a time domain of a third time interval. In this instance, the frame generation apparatus 300 may generate a preamble that includes at least one NRP/RP sequence in a time interval after the third time interval.

Here, a sign of the first NRP/RP sequence 703 with respect to the first time interval and a sign of the second NRP/RP sequence 705 may be identical to each other or may be different from each other. That is, a pair of the same signs or a pair of different signs may be assigned to elements of the first NRP/RP sequence 703 and elements of the second NRP/RP sequence 705. That is, signs may be assigned in a form of (+, +), (+, −), and (−, +)).

More specifically, when a sign pair pattern with respect to elements of the first NRP/RP sequence 703 and the second NRP/RP sequence 705 is (+, −), signs may be assigned to a preamble by maintaining signs of the elements of the first NRP/RP sequence 703 and by changing signs of the elements of the second NRP/RP sequence 705. When at least three NRP/RP sequences are assigned to a preamble, signs may be assigned to the preamble by only changing signs of elements of a last NRP/RP sequence.

Even though a CP is not included in a preamble described above with reference to FIG. 5 through FIG. 7, a CP with respect to a TD sequence, an RP sequence, and an NRP/RP sequence may be included.

Figure 8:
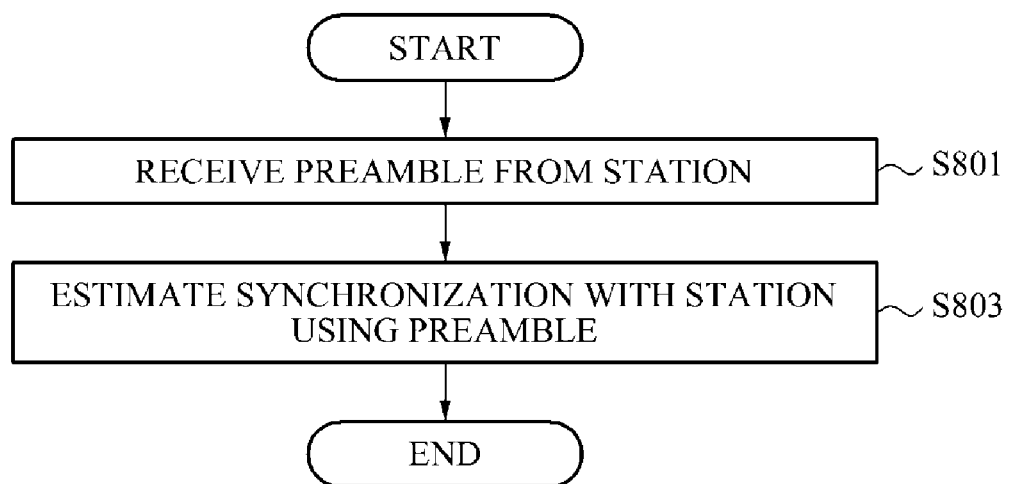
FIG. 8 is a flowchart illustrating a synchronization estimation method for wireless communication according to an embodiment of the present invention.

FIG. 8 is a flowchart illustrating a synchronization estimation method for wireless communication according to an embodiment of the present invention.

As shown in FIG. 8, the synchronization estimation method according to the present invention may be initiated from operation S801. In operation S801, a reception station may receive a preamble from a transmission station. In operation S803, the reception station may estimate synchronization with the transmission station using the preamble. Here, the preamble may be a preamble described above with reference to FIG. 2 through FIG. 7. That is, the preamble received by the reception station may be a preamble in which a base sequence for synchronization estimation and a modified sequence of the base sequence are assigned to a frequency domain of the same time interval. The modified sequence may include a complex conjugate sequence of the base sequence or a sequence having a sign different from a sign of the base sequence.

As described above, the preamble described above with reference to FIG. 2 through FIG. 7 may be robust against a frequency offset, and the synchronization estimation performance of the reception station receiving a preamble according to the present invention may be enhanced. Due to the enhancement of synchronization estimation performance, the complexity of the reception station may decrease. Each operation constituting the synchronization estimation method according to the present invention may be easily understood from view of an apparatus, and may be understood as a constituent element included in the reception station.

The above-described frame generation method may be applied even when generating a data frame. That is, instead of generating a sequence for synchronization estimation, a data frame in which bit data is assigned to a frequency domain may be generated. Hereinafter, FIG. 9 will be described.

Figure 9:
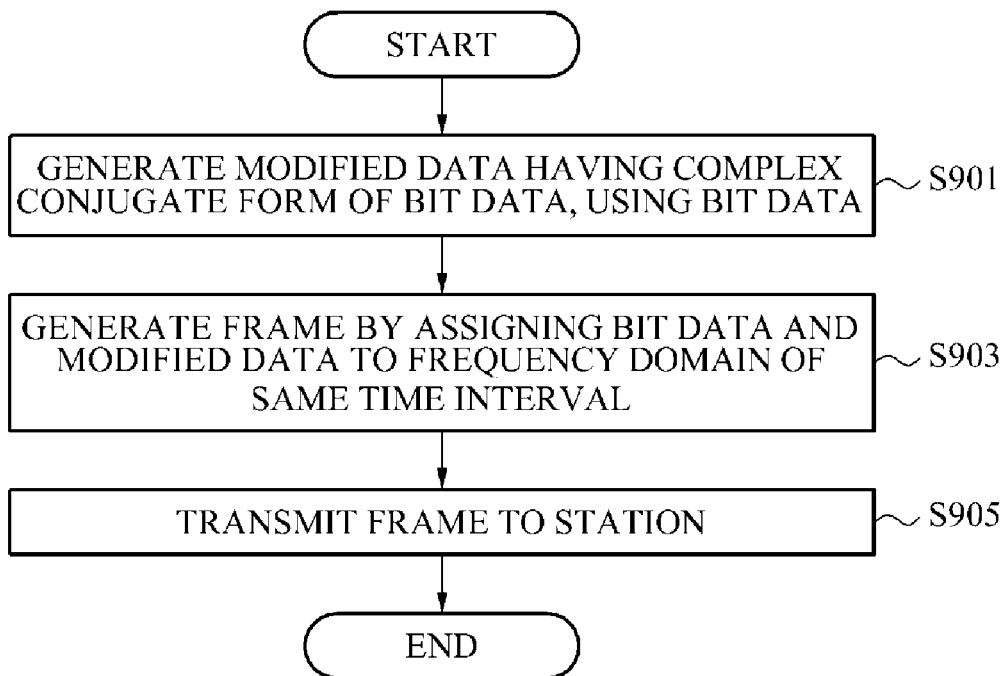
FIG. 9 is a flowchart illustrating a method of transmitting a frame for wireless communication according to another embodiment of the present invention.

FIG. 9 is a flowchart illustrating a method of transmitting a frame for wireless communication according to another embodiment of the present invention. As shown in FIG. 9, the frame transmission method according to the present invention may be initiated from operation S901.

In operation S901, a station performing wireless communication may generate modified data having a complex conjugate form of bit data, using the bit data. In operation S903, the station may generate a data frame by assigning the bit data and the modified data to a frequency domain of the same time interval. In operation S905, the station may transmit, to a reception station, the data frame that is generated in operation S903.

Here, as described above with reference to FIG. 4, the station may generate a data frame by alternately or sequentially assigning bit data and modified data to subcarriers. When the bit data and the modified data is sequentially assigned to subcarriers, the bit data may be assigned to a half of the entire subcarriers according to predetermined frequency resources, and the modified data may be assigned to the remaining half thereof.

For example, when a total number of available subcarriers is eight, bit data may be assigned to first to fourth subcarriers, and modified data may be assigned to fifth to eight subcarriers. That is, bit data may be assigned to a half of OFDM subcarriers according to predetermined frequency resources, and modified data may be assigned to the remaining half of OFDM subcarriers whereby a data frame may be generated. Here, the bit data may be data that include a plurality of symbols mapping complex coordinates. That is, the bit data may be data in the aforementioned complex sequence form. The modified data may be in a complex conjugate form of the bit data.

The modified data and the bit data may be identical to each other. Even in this case, the bit data and the modified data may be assigned to the frequency domain using the above-described method.

The frame transmission method of FIG. 9 may also be readily understood from view of an apparatus. That is, each operation constituting the frame transmission method of FIG. 9 may be easily understood from view of an apparatus, and may be understood as a constituent element included in the station. The reception station receiving the above data frame may decode the data frame. That is, the reception station may receive a data frame from a transmission station, and may decode data using the received data frame. The data frame reception method may also be understood as a constituent element included in the station.

The above-described frame generation method, frame reception method, and synchronization estimation method for wireless communication according to the present invention may be recorded as a computer program. A code and a code segment constituting the program may be readily inferred by a computer programmer in the field. Also, the program may be stored in computer-readable recording media (information storage media) and may be read and executed by a computer, thereby implementing the method of the present invention. The recording media may include any types of computer-readable recording media, for example, tangible media such as CD and DVD and intangible media such as subcarriers.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of transmitting a frame for wireless communication, the method comprising:

transmitting a plurality of repeated signals in time domain for automatic gain control (AGC) during a first orthogonal frequency-division multiplexing (OFDM) symbol interval of the frame; and transmitting a first sequence on every N-th sub-carrier of a first set of sub-carriers and a second sequence on every N-th sub-carrier of a second set of sub-carriers during a second OFDM symbol interval of the frame, the second OFDM symbol interval immediately following the first OFDM symbol interval, wherein sub-carriers other than the every N-th sub-carrier of the first set of sub-carriers and sub-carriers other than the every N-th sub-carrier of the second set of sub-carriers are nulled, wherein N is a natural number greater than 1, wherein the second sequence is the first sequence multiplied by −1, and wherein the first set of sub-carriers and the second set of sub-carriers are non-overlapped with each other.

2. The method of claim 1, wherein a rate between the first sequence and the second sequence is 1:1.

\* \* \* \* \*